(12) United States Patent
Miyamoto et al.

(10) Patent No.: US 7,382,491 B2
(45) Date of Patent: Jun. 3, 2008

(54) SCANNER RELAY APPARATUS AND IMAGE READING CONTROLLING METHOD

(75) Inventors: Kazunori Miyamoto, Kashihara (JP); Takeshi Yamaguchi, Yamatokoriyama (JP); Masakazu Suzuki, Yamatokoriyama (JP); Mariko Arai, Kashihara (JP); Masahiro Inoue, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 908 days.

(21) Appl. No.: 10/759,512

(22) Filed: Jan. 16, 2004

(65) Prior Publication Data

US 2004/0212842 A1 Oct. 28, 2004

(30) Foreign Application Priority Data

Jan. 16, 2003 (JP) ............................ P2003-007807

(51) Int. Cl.
*H04N 1/40* (2006.01)
(52) U.S. Cl. ........................................ 358/1.9; 358/468
(58) Field of Classification Search ................ 358/1.9, 358/2.1, 1.15, 468, 402
See application file for complete search history.

(56) References Cited

U.S. PATENT DOCUMENTS 6,388,771 B1   5/2002   Tamaki .................... 358/442
6,437,871 B1*  8/2002   Yuki ...................... 358/1.15
2007/0035762 A1* 2/2007 Wilsher et al. ........... 358/1.14

FOREIGN PATENT DOCUMENTS

JP   10-098574    4/1998
JP   10-269157   10/1998

* cited by examiner

*Primary Examiner*—Thomas D. Lee
*Assistant Examiner*—Stephen Brinich
(74) *Attorney, Agent, or Firm*—David G. Conlin; David A. Tucker; Edwards Angell Palmer & Dodge LLP

(57) ABSTRACT

A scan ID, which is operation identification information having been used for selection of an image reading condition or the like, is used for selection of a communication destination from among a plurality of host PCs having network-connection to a scanner relay apparatus. Information such as an image reading condition associated with the scan ID is sent to a host PC defined as a communication destination, and a scan command sent back from the host PC, whose protocol is converted, is sent to a scanner apparatus. Furthermore, image data sent back from the scanner apparatus is sent to the host PC.

15 Claims, 5 Drawing Sheets

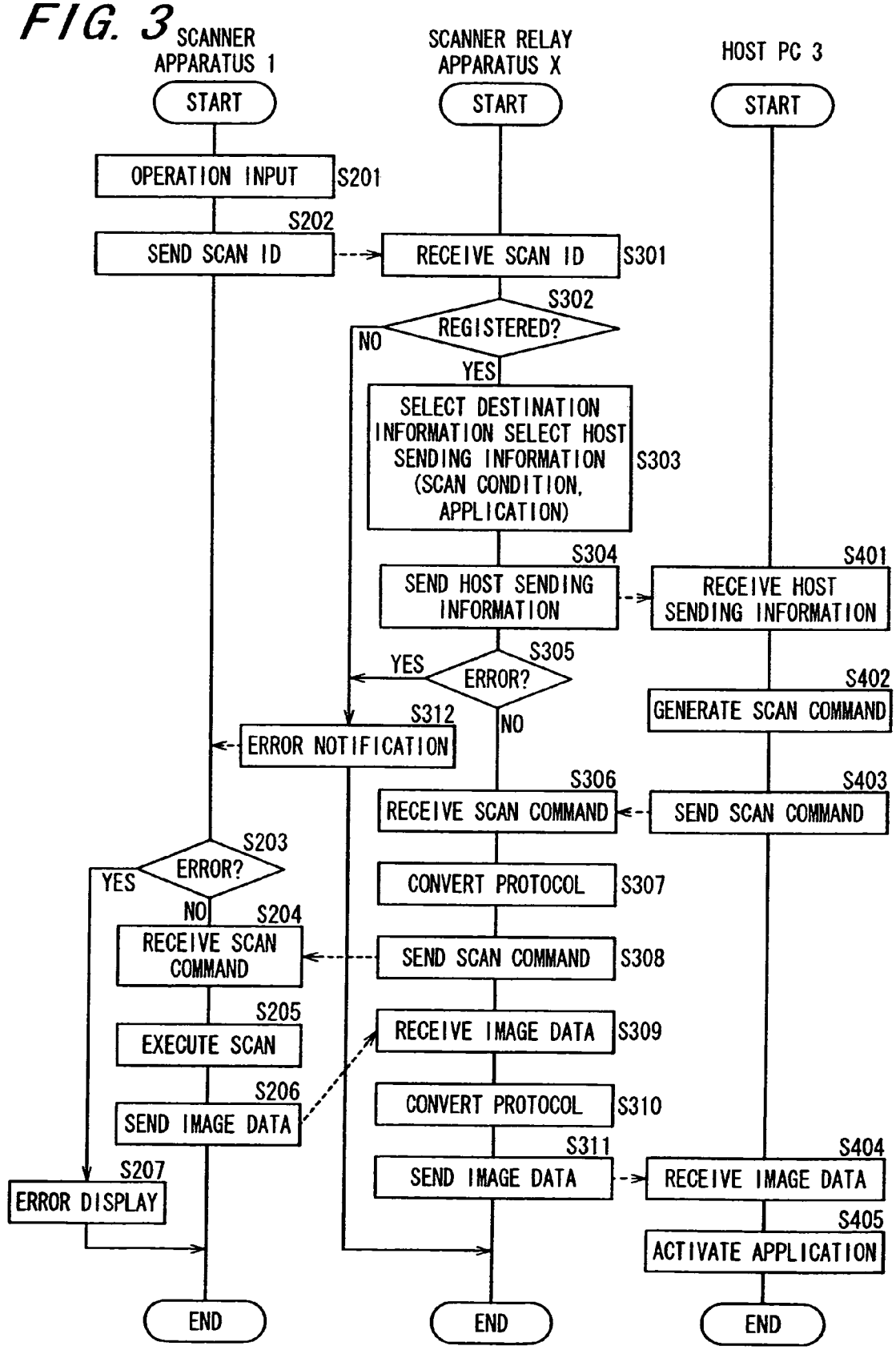

IMAGE READING CONDITION ETC. SENDING DATA

SCAN COMMAND SENDING DATA

IMAGE SENDING DATA

SCANNER RELAY APPARATUS AND IMAGE READING CONTROLLING METHOD

CROSS-REFERENCE TO RELATED APPLICATIONS

This Nonprovisional application claims priority under 35 U.S.C. §119(a) on Patent Application No. 2003-007807 filed in Japan on Jan. 16, 2003, the entire contents of which are hereby incorporated by reference.

BACKGROUND OF THE INVENTION

1. Field of the Invention

The present invention relates to a scanner relay apparatus that relays communication between a scanner apparatus and a plurality of terminals, the scanner apparatus sending out operation identification information associated with each of predetermined plural sorts of operation inputs, reading image data from an original according to an image reading command received from outside in response to the operation identification information and sending out the image data.

2. Description of the Related Art

At present, a network scanner apparatus that can be shared by network-connection to a plurality of terminals (users) such as personal computers is in the process of becoming widely used, but a network-inapplicable scanner apparatus used by one-to-one connection to one terminal is still utilized. There is a high need of making such a network-inapplicable scanner apparatus network-applicable.

By the way, among conventional network-inapplicable scanner apparatuses, there is a scanner apparatus that is provided with input means having, for instance, a plurality of scanning start buttons and thereby capable of executing plural sorts of operation inputs, and that is capable of previously registering conditions of reading original images, application software to be implemented at a terminal for handling read images or the like, into an external apparatus connected to the scanner apparatus for the respective operation inputs. In the following description, a network-inapplicable scanner apparatus that has a registering function as mentioned above will be referred to as a multi-condition registering type scanner apparatus.

A procedure of controlling image reading on the multi-condition registering type scanner apparatus will be described by using FIG. 5. FIG. 5 is a flowchart showing the procedure of controlling image reading on the conventional multi-condition registering type scanner apparatus. S101, S102 and successive numbers hereinafter represent numbers of processes (steps). In the following description, the multi-condition registering type scanner apparatus will be described as a scanner apparatus A.

First, on the scanner apparatus A, when one of the predetermined plural sorts of operation inputs is detected as having been performed (step S101), scan ID (an example of the operation identification information) which is identification information associated with the performed operation input is sent to a host apparatus (an example of the terminal) such as a personal computer connected one to one by a SCSI interface, a USB interface or the like (step S102: a process corresponding to a process of sending out the operation identification information).

Meanwhile, on the host apparatus, when the scan ID is received (step S111), a scan condition associated with the scan ID received at step S111 is selected on the basis of a scan condition (a condition of reading an original image) that is previously set (registered) for each of the scan IDs, and additionally, a scan command associated with the scan condition is generated (step S112). The scan command is a command for causing the scanner apparatus A to execute image reading on the scan condition. Furthermore, the scan command thus generated is sent to the scanner apparatus A (step S113).

On the other hand, on the scanner apparatus A, when the scan command sent from the host apparatus is received (step S103), scanning (reading an original image) is executed under an image reading condition (color/monochrome, resolution, density or the like) complying with the scan command (step S104), and the read image data is sent to the host apparatus (step S105: a process corresponding to a process of sending out image data).

Meanwhile, on the host apparatus, when the image data from the scanner apparatus A is received (step S114), application software for handling image data (software for displaying and editing an image) that is previously set (registered) for each of the scan IDs is activated with the received image data being specified. This leads to a state in which the image data received at step S114 can be handled by the activated application software.

Such processing as mentioned above can save time to vary a set scan condition for each use on the presumption that different scan conditions (image reading conditions) and different application software programs are set (registered) for the respective scan IDs.

Here, the multi-condition registering type scanner apparatus is a so-called push type scanner apparatus having a system in which reading an image is executed by a user's operation of starting to read an image on a side of the scanner apparatus and read image data is sent toward the host apparatus.

Meanwhile, as prior art of making the network-inapplicable scanner apparatus network-applicable, for instance, Japanese Unexamined Patent Publication JP-A 10-269157 (1998) discloses a peripheral equipment control apparatus which can interconnect a SCSI interface with a network interface and can transmit data between equipments connected to these interfaces respectively.

However, as to a scanner apparatus to which the art disclosed in JP-A 10-269157 is applied, the scanner apparatus is a so-called pull type scanner apparatus having a system in which by a user's operation of starting to read an image on a side of the host apparatus, image reading is executed on a side of the scanner apparatus and read image data is sent back toward the host apparatus, and there is a problem that the scanner apparatus cannot be applied to the push type scanner apparatus like the multi-condition registering type scanner apparatus.

SUMMARY OF THE INVENTION

Accordingly, the invention was made in consideration of the above-mentioned circumstances. A feature of the invention is to provide a scanner relay apparatus and an image reading control method by which a push type network-inapplicable scanner apparatus such as the multi-condition registering type scanner apparatus that sends out identification information associated with each of plural sorts of operation inputs, reads image data according to an image reading command received from outside in response to the identification information and sends out the image data can be made to be network-applicable.

To achieve the above-mentioned object, the invention provides a scanner relay apparatus for relaying communication between a scanner apparatus and a plurality of terminals, the scanner apparatus sending out operation identification information associated with each of predetermined plural sorts of operation inputs, reading image data from an original according to an image reading command received from outside in response to the operation identification information and sending out the image data, the scanner relay apparatus comprising:

first association information storing means for storing first association information about association between the respective operation identification information and destination information of the respective terminals;

operation identification information receiving means for receiving the operation identification information from the scanner apparatus;

terminal selection means for selecting a destination terminal that is the terminal to be defined as a communication destination, on the basis of the operation identification information received from the scanner apparatus and the first association information stored in the first association information storing means;

image reading command sending means for sending the image reading command to the scanner apparatus in response to reception of the operation identification information received from the scanner apparatus; and image data receiving and sending means for receiving the image data sent back from the scanner apparatus and sending the received image data to the destination terminal.

This scanner relay apparatus uses the operation identification information (the scan ID or the like) having been used for selection of an image reading condition or the like up to now, in order to select a terminal to be defined as the communication destination (a destination to which image data is sent) from among a plurality of terminals (users) having network-connection to the scanner relay apparatus.

According to the invention, a push type network-inapplicable scanner apparatus (the multi-condition registering type scanner apparatus), which sends out identification information associated with each of plural sorts of operation inputs, reads image data in accordance with an image reading command received from outside in response to the identification information and sends out the image data, can be made to be network-applicable so as to be shared among a plurality of terminals (users).

Further, in the invention, the scanner relay apparatus further comprises:

second association information storing means for storing second association information about association between the each of the operation identification information and predetermined terminal sending information sent to the terminal;

terminal sending information selection sending means for selecting the terminal sending information sent to the destination terminal, on the basis of the operation identification information received from the scanner apparatus and the second association information stored in the second association information storing means, and sending the selected terminal sending information to the destination terminal; and image reading command receiving means for receiving the image reading command sent back from the destination terminal, wherein the image reading command received by the image reading command receiving means is sent by the image reading command sending means.

According to the invention, it is possible to constitute so as to utilize a function of sending the image reading command that the terminal has had so far.

Furthermore, in the invention, the terminal sending information contains information about a condition of reading an original image on the scanner apparatus and/or a program for handling the image data on the terminal.

According to the invention, for example, in a case where the number of the sorts of the operation identification information is more than the number of the terminals, it is possible to associate (destination information of) a single terminal with the plural operation identification information, and set conditions of reading original images and programs for handling image data that vary depending on the operation identification information, whereby it also becomes possible to realize a conventional function of setting a plurality of image reading conditions or the like corresponding to operation inputs on the scanner apparatus for one terminal.

Still further, in the invention, there is a possible configuration other than a configuration that the image reading command is received from the terminal as mentioned above. For instance, the scan relay apparatus further comprises:

third association information storing means for storing third association information about association between each of the operation identification information and information about the image reading command sent to the scanner apparatus; and image reading command determining means for determining the image reading command sent by the image reading command sending means, on the basis of the operation identification information received from the scanner apparatus and the third association information stored in the third association information storing means.

According to the invention, there is no need to perform communication to get the image reading command from the terminal (the destination terminal) for every reception of the operation identification information from the scanner apparatus.

Still further, in the invention, the scan relay apparatus further comprises association information external setting means for receiving the first association information and the second or third association information from the terminal and setting.

According to the invention, since there is no need to arrange input means for inputting the first to third association information in the scanner relay apparatus, it is possible to miniaturize the apparatus, and since there is no need to necessarily install at a place where a user can operate, the flexibility of an installation place is enhanced.

Still further, in the invention, the scan relay apparatus further comprises authentication means for receiving predetermined authentication information such as a password for each reception of the operation identification information from the scanner apparatus and authenticating on the basis of the authentication information, wherein the image data is sent by the image data receiving and sending means only when authentication by the authentication means is established.

According to the invention, in a case where the scanner apparatus has a function of inputting and sending out the authentication information such as a password, it is possible to prevent image data from being sent to another terminal because of incorrect operation input on the scanner apparatus.

Still further, the invention may be structured as a method of controlling image reading by the use of the scanner relay apparatus.

In specific, the invention provides an image reading controlling method executed by the use of a scanner apparatus for sending out operation identification information corresponding to each of predetermined plural sorts of operation inputs, reading image data from an original in accordance with an image reading command received from outside in response to the operation identification information and sending out the image data, a plurality of terminals, and a scanner relay apparatus for relaying communication between the scanner apparatus and the terminals, the image reading controlling method comprising the steps of:

on the scanner apparatus, sending the operation identification information to the scanner relay apparatus;

on the scanner relay apparatus, selecting a destination terminal that is the terminal defined as a communication destination on the basis of association information on association between the operation identification information received from the scanner apparatus and destination information of each of the terminals;

on the scanner relay apparatus, sending the image reading command associated with the operation identification information received from the scanner apparatus to the scanner apparatus;

on the scanner-apparatus, reading image data from an original in accordance with the image reading command received from the scanner relay apparatus and sending the image data back to the scanner relay apparatus;

on the scanner relay apparatus, receiving the image data sent back from the scanner apparatus and sending the image data to the destination terminal; and on the destination terminal, receiving the image data from the scanner relay apparatus.

According to the invention, operation identification information associated with plural sorts of operation inputs of a scanner apparatus having been used for selection of an image reading condition or the like so far is used for section of a terminal defined as a communication destination (a destination to which image data is sent) from among a plurality of terminals (users) having network-connection, so that it is possible to make a push type network-inapplicable scanner apparatus network-applicable, and share by a plurality of terminals (users).

BRIEF DESCRIPTION OF THE DRAWINGS

Other and further objects, features, and advantages of the invention will be more explicit from the following detailed description taken with reference to the drawings wherein:

FIG. 3 is a flowchart showing a procedure of controlling image reading in the scanner system that includes the scanner relay apparatus according to the embodiment of the invention as a component;

DETAILED DESCRIPTION

Referring to the attached drawings, an embodiment of the present invention will be described below to understand the invention. The embodiment in the following description is an example that embodies the invention, and is not to limit the technical range of the invention.

Figure 1:
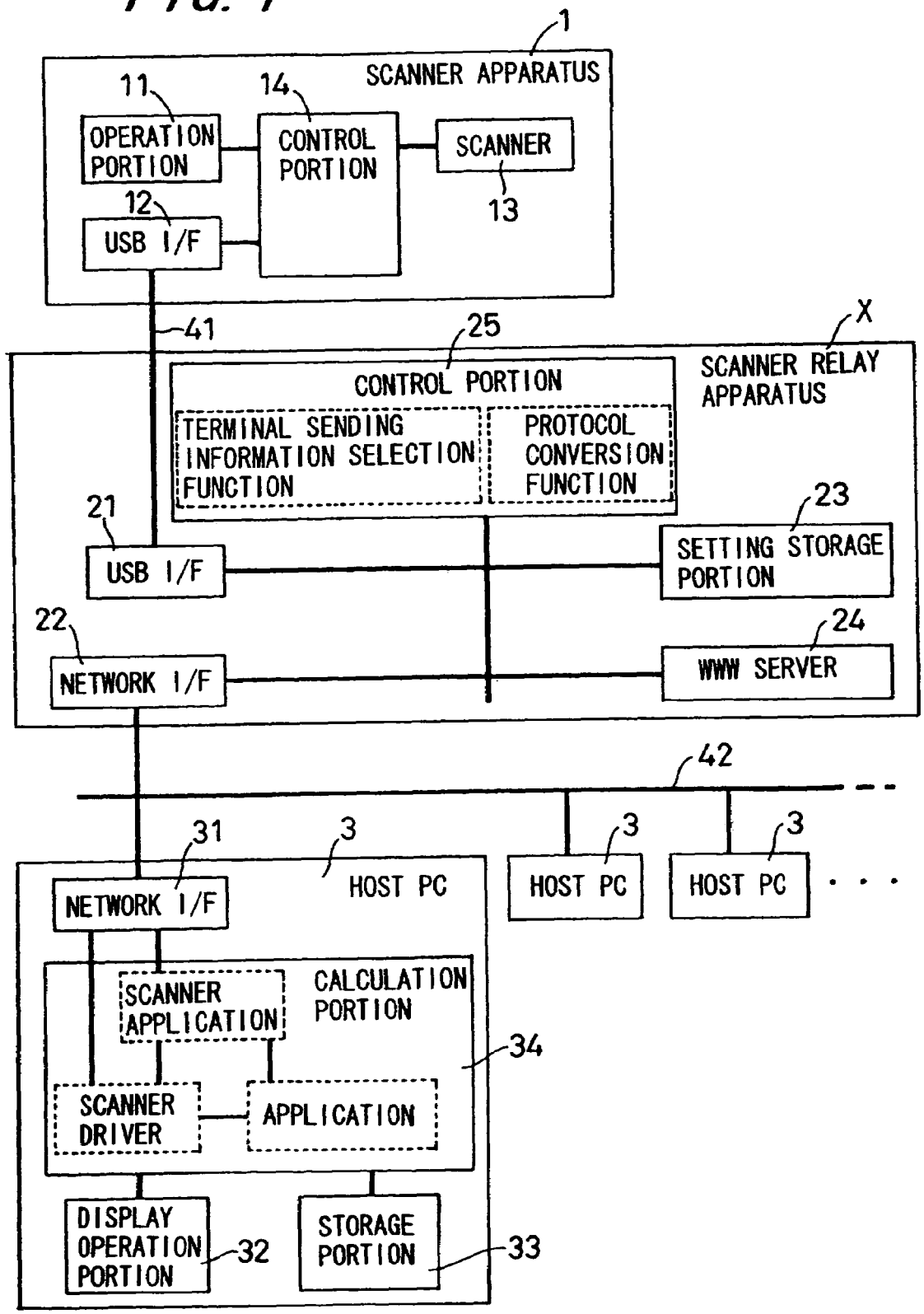
FIG. 1 is a block diagram showing the constitutions of a scanner relay apparatus according to an embodiment of the invention and a scanner system that includes the scanner relay apparatus as a component.
Figure 2:
FIG. 2 is a view showing the constitution of association information stored in a setting storage portion provided in the scanner relay apparatus according to the embodiment of the invention.
Figure 4A:
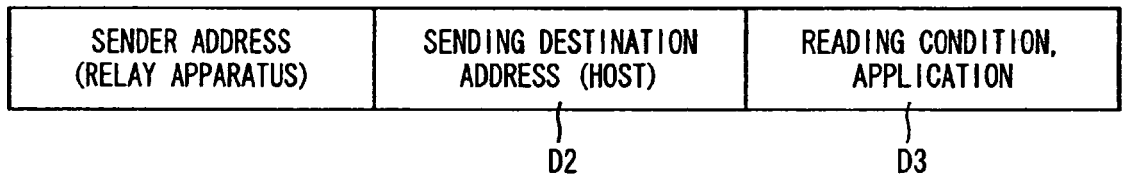
FIGS. 4A to 4C are views showing the constitution of communication data in the scanner system that includes the scanner relay apparatus according to the embodiment of the invention as a component.
Figure 4B:
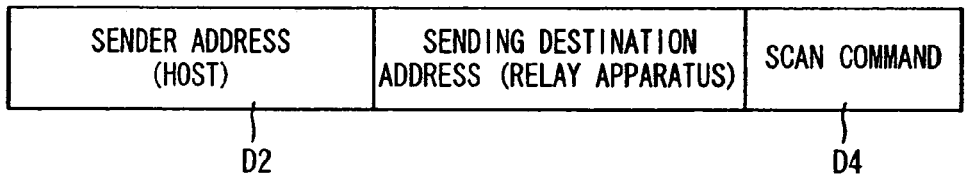
Figure 4C:
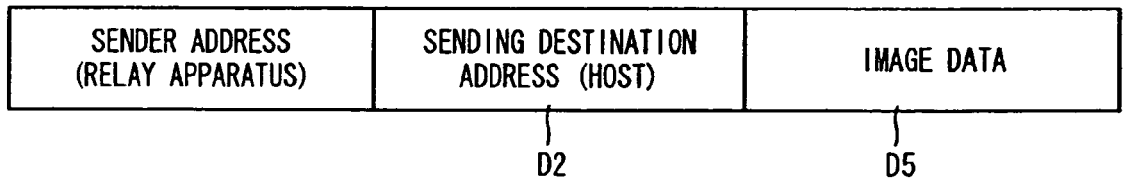

Here, FIG. 1 is a block diagram showing the constitutions of a scanner relay apparatus X according to the embodiment of the invention and a scanner system that includes the scanner relay apparatus as a component, FIG. 2 is a view showing the constitution of association information stored in a setting storage portion provided in the scanner relay apparatus X according to the embodiment of the invention, FIG. 3 is a flowchart showing a procedure of controlling image reading in the scanner system that includes the scanner relay apparatus X according to the embodiment of the invention as a component, and FIGS. 4A to 4C are views showing the constitutions of communication data in the scanner system that includes the scanner relay apparatus X according to the embodiment of the invention as a component.

Firstly, by the use of FIG. 1, the constitutions of the scanner relay apparatus X according to the embodiment of the invention and the scanner system that includes the scanner relay apparatus as a component will be described.

As shown in FIG. 1, the scanner relay apparatus X is connected to a push type scanner apparatus 1 and a plurality of host PCs 3 which are terminals such as personal computers, and relays communication between the scanner apparatus 1 and the plurality of host PCs 3.

The scanner relay apparatus X comprises a USB (universal serial bus) interface (USB I/F) 21 for performing data transmission (communication) of the USB standard with the scanner apparatus 1 via a connection cable 41 for a USB interface; a network interface (network I/F) 22 that performs communication with the plurality of host PCs 3 via a predetermined network 2; a setting storage portion 23 that is rewritable nonvolatile storing means such as a SRAM and stores various setting data; a WWW server 24 that performs communication with the host PCs 3 via the network 2 and the network I/F 22 by the HTTP protocol, and performs registration and change of the data stored in the setting storage portion 23; and a control portion 25 that is constituted by a CPU and peripheral apparatuses, and that realizes, by execution of a predetermined program, a function of converting a communication protocol between communication by the USB I/F 21 and communication by the network I/F 22 and a function of selecting information associated with scan ID, which will be described later, sent from the scanner apparatus 1 (referred to as host sending information (an example of the terminal sending information) hereafter) from among information stored in the setting storage portion 23, and moreover, executes various controls of the scanner relay apparatus X.

Meanwhile, the scanner apparatus 1 comprises a display operation portion 11 that is capable of performing plural sorts of operation inputs when provided with a plurality of scan starting buttons or the like, and that provides display regarding the operation input, predetermined error display or the like; a USB interface (USB I/F) 12 that performs data transmission (communication) of the USB standard with the scanner apparatus 1 via the connection cable 41; a scanner 13 that reads an image from an original; and a control portion 14 that executes various controls of the whole scanner apparatus 1.

Figure 5:
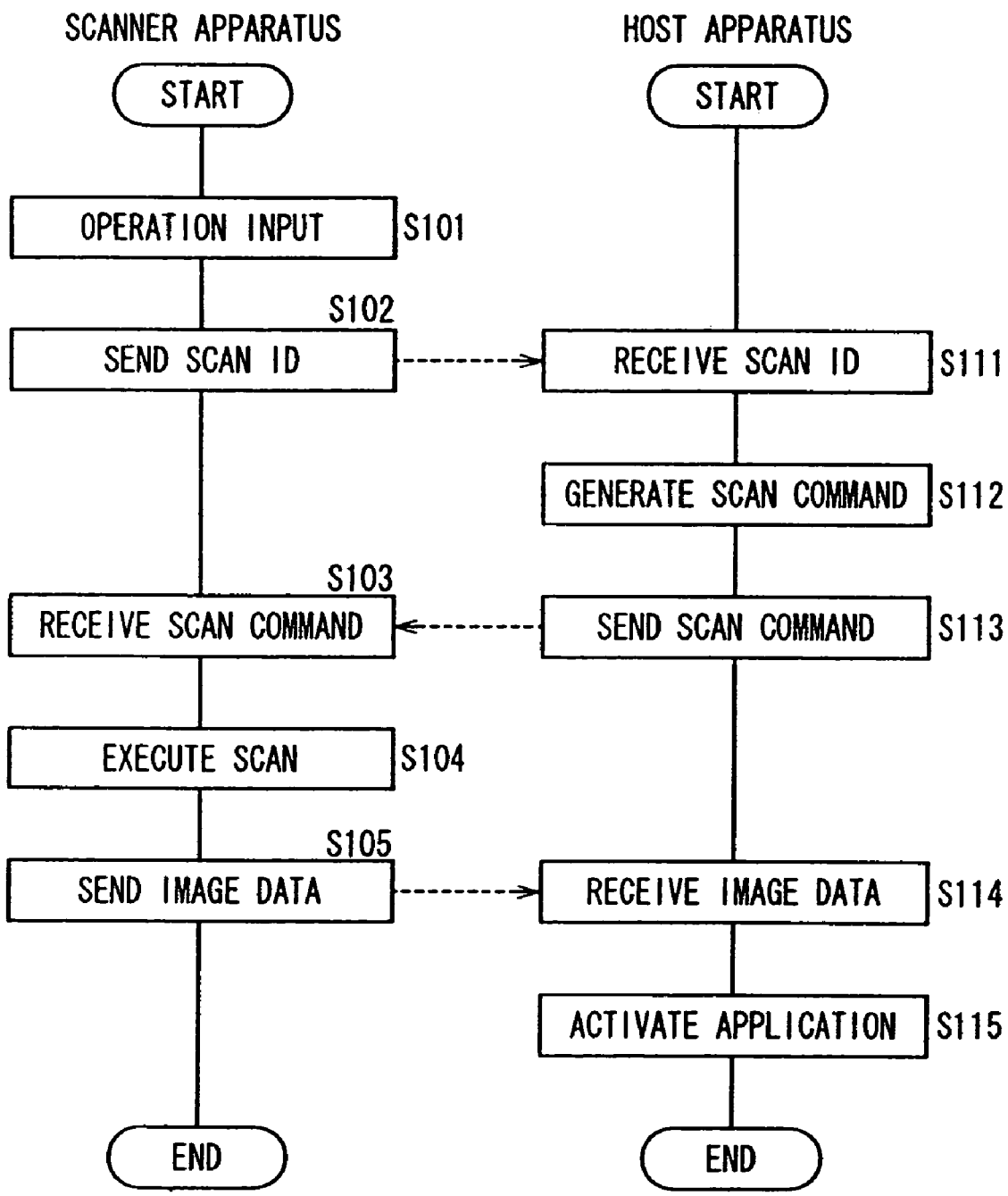
FIG. 5 is a flowchart showing a procedure of controlling image reading in a conventional multi-condition registering type scanner.

The scanner apparatus 1 is the conventional multi-condition registering type scanner apparatus in which a condition of reading an original image, application software executed by the terminal for handing a read image or the like can be previously registered into an external apparatus connected to the scanner apparatus 1 for each of the plural sorts of operation inputs from the display operation portion 11. That is to say, the scanner apparatus 1 is connected to a terminal such as a personal computer via the USB I/F 12, and has a function of sending out the scan ID, reading (scanning) an original image and sending out read image data by control of image reading according to a procedure shown in FIG. 5 executed by the control portion 14. Therefore, it is a so-called push type scanner apparatus that employs a system of executing image reading by an operation of starting image reading executed by the user on the scanner apparatus side, and sending read image data to the host apparatus side.

Further, each of the host PCs 3 comprises a network interface (network I/F) 31 that performs communication with the scanner relay apparatus X via a predetermined network 42 such as a network compliant with the IEEE 802.3 standard; a display operation portion 32 constituted by displaying means such as a CRT and inputting means such as a keyboard or a mouse; a storage portion 33 that is storing means such as a hard disk; and a calculation portion 34 that is constituted by a CPU and peripheral apparatuses and performs various calculations and controls.

In the calculation portion 34 of the host PC 3, a scanner application, which is a predetermined resident program, is executed at all times. The scanner application is for reading out a scanner driver which is a program that sends an image reading command to the scanner apparatus 1 and an application program (application software) that handles image data sent from the scanner apparatus 1 via the scanner relay apparatus X, from the storage portion 33 in accordance with information sent from the scanner relay apparatus X, and activating (executing).

Further, a so-called Web browser is installed in the host PC, and is capable of accessing the WWW server 24 of the scanner relay apparatus X by the use of the Web browser.

FIG. 2 is a view showing the constitution of association information D, which is information contained (stored) in the setting storage portion 23.

The association information D (an example of the first and second association information) is information in which each of the scan IDs (D1) is associated with destination information D2 of each of the terminals (an IP address for performing TCP/IP communication via the network 42 in the example of FIG. 2) and the host sending information D3 which is information sent to the host PC 3.

The host sending information D3 contains an original image reading condition D31 (resolution of an image (dpi), monochrome/color or the like) in the scanner apparatus 1 and identification information D32 of an application program that handles image data read by the scanner apparatus 1 in the host PC 3.

The association information D is set (externally set) from the host PC 3 when a predetermined URL is designated from the Web browser of the host PC 3 and the WWW server 24 of the scanner relay apparatus X is accessed. On the scanner relay apparatus X, the WWW server 24 sends a predetermined setting screen to the host PC 3 in response to an access from the host PC 3, and the association information D inputted from the setting screen is sent to the WWW server 24 by the Web browser of the host PC 3, whereby the association information D received by the WWW server 24 is stored into the setting storage portion 23 (an example of the first and second association information storing means). Here, the WWW server 24 and the network I/F 22 are examples of the association information external setting means.

Consequently, since there is no need to provide the scanner relay apparatus with inputting means for inputting the association information D, it is possible to miniaturize the apparatus, and since there is no need to necessarily install at a place where the user can operate, the flexibility of an installation place is enhanced.

Next, a procedure of controlling image reading in the scanner system that includes the scanner relay apparatus shown in FIG. 1 as a component will be described by the use of FIG. 3. FIG. 3 is a flowchart showing a procedure of controlling image reading in the scanner system. In the following description, S202, S202 and successive numbers represent the numbers of processes (steps).

First, on the scanner apparatus 1, when execution of one of predetermined plural sorts of operation inputs is detected (step S201), the scan ID (an example of the operation identification information) which is identification information associated with the executed operation input is sent to the scanner relay apparatus X via the USB I/F 12 (step S202: a process corresponding to a process of sending out the operation identification information).

Meanwhile, on the scanner relay apparatus X, when the USB I/F 21 receives the scan ID (step S301), the control portion 25 refers to the association information D stored in the setting storage portion 23, and in a case where the destination information D1 and the host sending information D2 associated with the received scan ID are present (registered) (Yes is obtained at step S302), the information D1 and D2 are selected (step S303: an example of the terminal selecting means). The host PC 3 that is associated with the destination information D1 and selected here will be referred to as a destination host PC (corresponding to the destination terminal) hereafter.

Next, the host sending information D2 selected at step S303 is sent to the destination host PC by the network I/F 22 (step S304) (steps S303 and S304 are examples of processes of the terminal sending information selection sending means). Here, as shown in FIG. 4A, data sent (image reading condition etc. sending data) contains destination information of the scanner relay apparatus X which is a sender (a sender address), the destination information D2 of the destination host PC which is a sending destination (a sending destination address), and the host sending information D3 selected at step S303. When the destination information D2 of the destination host PC is designated as the sending destination address, the data reaches the destination host PC.

On the other hand, on the destination host PC 3, when the network I/F 31 receives the host sending information D2 (step S401), the scanner driver is activated by the scanner application and a scan command (an example of the image reading command) associated with the image reading condition D31 contained in the host sending information D2 is generated by the scanner driver (step S402). The scan command is a command for causing the scanner apparatus 1 to execute image reading under the image reading condition D31. Moreover, the scan command generated in this manner is sent to the scanner relay apparatus X by the network I/F 31 (step S403). Here, as shown in FIG. 4B, data sent (scan command sending data) contains the destination information D2 of the destination host PC which is a sender (a sender address), destination information of the scanner relay apparatus X which is a sending destination (a sending destination address), and the scan command D4 generated at step S402.

When the sender address (that is, the address of the scanner relay apparatus X) contained in the data received from the scanner relay apparatus X (the image reading condition etc. sending data) is designated as the sending destination address, the data reaches the scanner relay apparatus X.

Meanwhile, on the scanner relay apparatus X, when the network I/F 22 sends the host sending information D3 at step S304, and thereafter, receives the scan command D4 from the destination host PC 3 before a predetermined timeout period is elapsed (No is obtained at step S305 and the process proceeds to step S306), the control portion 25 converts the communication protocol of received data (converts a communication protocol by the network I/F 22 to a communication protocol by the USB I/F 12) (step S307), and data whose protocol having been converted (that is, the scan command D4) is sent to the scanner apparatus 1 by the USB I/F 21 (step S308: an example of the process of the image reading command sending means).

On the other hand, on the scanner apparatus 1, when the network I/F 12 sends the scan ID (D1) at step S202, and thereafter, receives the scan command D4 without receiving a predetermined error notification from the scanner relay apparatus X (No is obtained at step S203 and the process proceeds to step S204), the control portion 14 and the scanner 13 read an original image in accordance with the received scan command D4 (execute scanning, step S205), the read image data is sent to the scanner relay apparatus X by the USB I/F 12, and thereafter, the processing by the scanner apparatus 1 is ended.

Meanwhile, on the scanner relay apparatus X, when the USB I/F 21 receives the image data from the scanner apparatus 1 (step S309), the control portion 25 converts the communication protocol of the received data (converts a communication protocol by the USB I/F 12 to a communication protocol by the network I/F 22) (step S310), the network I/F 22 sends data whose protocol has been converted (that is, the image data) to the destination host PC 3 (step S311), and thereafter, the processing by the scanner relay apparatus X is ended. Here, the processing from steps S309 to S311 is an example of the processing by the image data receiving and sending means. Here, as shown in FIG. 4C, the sent data (image sending data) contains destination information of the scanner relay apparatus X which is a sender (a sender address), the destination information D2 of the destination host PC which is a sending destination (a sending destination address), and the image data D5 received at step S309.

On the other hand, on the destination host PC 3, when the network I/F 31 receives the image data from the scanner relay apparatus X (step S404), by the scanner application, an application program associated with identification information D32 of the application program contained in the host sending information D2 received at step S401 is activated with the received image data designated (step S405), and thereafter, the processing by the destination host PC 3 is ended. This leads to a state that the image data received at step S404 can be handled by the activated application program.

This scanner relay apparatus X is structured to use the scan ID (D1) that has been used for selection of an image reading condition or the like so far, for selection of the host PC 3 defined as a communication destination (a destination to which the image data is sent) from among the plurality of host PCs (users) 3 having network-connection to the scanner relay apparatus X.

Consequently, it becomes possible to make the push type network-inapplicable scanner apparatus 1 (the multi-condition registering type scanner apparatus) network-applicable, and share by the plurality of host PCs (users) 3.

Further, since the original image reading condition D31 in the scanner apparatus 1 and the identification information D32 of a program that handles image data in the host PC3 are contained in the host sending information D3, which is sent to the host PC 3, it is possible to associate the destination information D2 of one of the host PCs 3 with the plural different scan IDs (D1), and set the original image reading condition D31 and the identification information D32 of an image data handling program that vary depending on the scan ID (D1), for example, as shown in FIG. 2. In the example of FIG. 2, the same host PC destination information is set in each of a case where the values of the scan IDs (D1) are 'SC1' and 'SC2,' a case where the values are 'SC3' and 'SC4,' and a case where the values are 'SC7' and 'SC8.' Consequently, it also becomes possible to realize a conventional function of setting a plurality of image reading conditions and handling programs responsive to operation input (that is, the scan ID (D1)) in the scanner apparatus 1 to one host PC 3.

Meanwhile, on the scanner relay apparatus X, in a case where the destination information D1 and host sending information D2, that are associated with the received scan ID, does not exist after the scan ID is received at step S301 (No is obtained at step S302), and in a case where the scan command D4 is not received from the destination host PC 3 before a predetermined timeout period is elapsed after the host sending information D3 is sent at step S304 (Yes is obtained at step S305), the USB I/F 12 gives a predetermined error notification to the scanner apparatus 1 (step S312), and thereafter, the processing by the scanner relay apparatus X is ended.

Further, in the scanner apparatus 1, in a case where the error notification from the scanner relay apparatus X is received after the scan ID (D1) is sent at step S202 (Yes is obtained at step S203), predetermined error display is provided in the display operation portion 11 (step S207), and thereafter, the processing by the scanner apparatus 1 is ended.

Although the scanner relay apparatus X is structured to receive the scan command (an example of the image reading command) from the host PC 3 as mentioned before, another constitution is possible.

For example, it is possible to constitute the apparatus so that the scan command is generated by the control portion 25 of the scanner relay apparatus X on the basis of the image reading condition D31 (an example of information on the image reading command) contained in the association information D. In specific, it is such a constitution that the control portion 25 of the scanner relay apparatus X executes the process at step S402 on the host PC 3 (the destination host PC) shown in FIG. 3. In this case, the setting storage portion 23 is an example of the third association information storing means.

This eliminates the need to perform communication for acquiring the scan command D4 from the host PC 3 (the destination host PC) every time receiving the scan ID (D1) from the scanner apparatus 1.

Further, in a case where the scanner apparatus 1 has a function of inputting and sending out predetermined authentication information such as a password, it can be thought to constitute the apparatus so that the authentication information is received for each of the scan IDs (D1) from the scanner apparatus 1, the control portion 25 authenticates based on the authentication information, and image data is sent to the destination host PC 3 (step S311 of FIG. 3) only in a case where authentication is established. In this case, for example, by setting the authentication information such as a password for each scan ID (D1) of the association information D (FIG. 2) and comparing the authentication information received from the scanner apparatus 1 and the authentication information set in the association information D, it is possible to authenticate. In this case, it is good to constitute so that the authentication information set in the association information D can also be externally set from the host PC 3 by the WWW server 24.

This prevents image data from being sent to another host PC 3 that is not aimed, because of wrong operation input in the scanner apparatus 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A scanner relay apparatus for relaying communication between a scanner apparatus and a plurality of terminals, the scanner apparatus sending out operation identification information associated with each of predetermined plural sorts of operation inputs, reading image data from an original according to an image reading command received from outside in response to the operation identification information and sending out the image data, the scanner relay apparatus comprising:

means for storing first association information about association between the respective operation identification information and destination information of the respective terminals;

operation identification information receiving means for receiving the operation identification information from the scanner apparatus;

terminal selection means for selecting a destination terminal that is the terminal to be defined as a communication destination, on the basis of the operation identification information received from the scanner apparatus and the first association information stored in the means for storing first association information;

image reading command sending means for sending the image reading command to the scanner apparatus in response to reception of the operation identification information received from the scanner apparatus; and image data receiving and sending means for receiving the image data sent back from the scanner apparatus and sending the received image data to the destination terminal.

2. The scanner relay apparatus of claim 1, further comprising:

means for storing second association information about association between each of the operation identification information and predetermined terminal sending information sent to the terminal;

terminal sending information selection sending means for selecting the terminal sending information sent to the destination terminal, on the basis of the operation identification information received from the scanner apparatus and the second association information stored in the means for storing second association information, and sending to the selected terminal sending information to the destination terminal; and image reading command receiving means for receiving the image reading command sent back from the destination terminal, wherein the image reading command received by the image reading commend receiving means is sent by the image reading command sending means.

3. The scanner relay apparatus of claim 2, wherein the terminal sending information contains information about a condition of reading an original image on the scanner apparatus and/or a program for handling the image data on the terminal.

4. The scanner relay apparatus of claim 1, further comprising:

means for storing third association information about association between each of the operation identification information and information about the image reading command sent to the scanner apparatus: and image reading command determining means for determining the image reading command sent by the image reading command sending means, on the basis of the operation identification information received from the scanner apparatus and the third association information stored in the means for storing third association information.

5. The scanner relay apparatus of claim 2, further comprising association information external setting means for receiving the first association information and the second association information from the terminal and setting.

6. The scanner relay apparatus of claim 4, further comprising association information external setting means for receiving the first association information and the third association information from the terminal and setting.

7. The scanner relay apparatus of claim 1, further comprising authentication means for receiving predetermined authentication information for each reception of the operation information from the scanner apparatus and authenticating on the basis of the authentication information, wherein the image data is sent by the image data receiving and sending means only when authentication by the authentication means is established.

8. An image reading controlling method executed by the use of a scanner apparatus for sending out operation identification information corresponding to each of predetermined plural sorts of operation inputs, reading image data from an original in accordance with an image reading command received from outside in response to the operation identification information and sending out the image data, a plurality of terminals, and a scanner relay apparatus for relaying communication between the scanner apparatus and the terminals, the image reading controlling method comprising the steps of:

on the scanner apparatus, sending the operation identification information to the scanner relay apparatus;

on the scanner relay apparatus, selecting a destination terminal that is the terminal defined as a communication destination on the basis of association information on association between the operation identification information received from the scanner apparatus and destination information of each of the terminals;

on the scanner relay apparatus, sending the image reading command associated with the operation identification information received from the scanner apparatus to the scanner apparatus;

on the scanner apparatus, reading image data from an original in accordance with the image reading command received from the scanner relay apparatus and sending the image data back to the scanner relay apparatus;

on the scanner relay apparatus, receiving the image data sent back from the scanner apparatus and sending the image data to the destination terminal; and on the destination terminal, receiving the image data from the scanner relay apparatus.

9. A scanner relay apparatus for relaying communication between a scanner apparatus and a plurality of terminals, the scanner apparatus sending out operation identification information associated with each of predetermined plural sorts of operation inputs, reading image data from an original according to an image reading command received from outside in response to the operation identification information and sending out the image data, the scanner relay apparatus comprising:

a memory for storing first association information about an association between the respective operation identification information and destination information of the respective terminals;

an operation identification information receiver for receiving the operation identification information from the scanner apparatus;

a terminal selector for selecting a destination terminal that is the terminal to be defined as a communication destination, on the basis of the operation identification information received from the scanner apparatus and the first association information stored in the memory for storing first association information;

an image reading command sender for sending the image reading command to the scanner apparatus in response to a reception of the operation identification information received from the scanner apparatus; and an image data receiver/sender for receiving the image data sent back from the scanner apparatus and sending the received image data to the destination terminal.

10. The scanner relay apparatus of claim 9, further comprising:

a memory for storing second association information about association between the each of the operation identification information and predetermined terminal sending information sent to the terminal;

a terminal sending information selection sender for selecting the terminal sending information sent to the destination terminal, on the basis of operation identification information received from the scanner apparatus and the second association information stored in the memory for storing second association information, and sending the selected terminal sending information to the destination terminal; and an image reading command receiver for receiving the image reading command sent back from the destination terminal wherein the image reading command received by the image reading command receiver is sent by the image reading command sender.

11. The scanner relay apparatus of claim 10, wherein the terminal sending information contains information about a condition of reading an original image on the scanner apparatus and/or a program for handling the image data on the terminal.

12. The scanner relay apparatus of claim 9, further comprising:

a memory for storing third association information about an association between each of the operation identification information and information about the image reading command sent to the scanner apparatus; and an image reading command determining portion for determining the image reading command sent by the image reading command sender, on the basis of the operation identification information received from the scanner apparatus and the third association information stored in the memory for storing third association information.

13. The scanner relay apparatus of claim 10, further comprising an association information external setting portion for receiving the first association information and the second association information from the terminal and setting.

14. The scanner relay apparatus of claim 12, further comprising an association information external setting portion for receiving the first association information and the third association information from the terminal and setting.

15. The scanner relay apparatus of claim 9, further comprising an authentication portion for receiving predetermined authentication information for each reception of the operational identification information from the scanner apparatus and authenticating on the basis of the authenticating information, wherein the image data is sent by the image data receiver/sender only when authentication by the authentication portion is established.

* * * * *